US011407954B2

(12) United States Patent
Ostvik

(10) Patent No.: US 11,407,954 B2
(45) Date of Patent: Aug. 9, 2022

(54) PROCESSING OF LOW RANK COAL

(71) Applicant: ECOGENSUS LLC, Hartford, CT (US)

(72) Inventor: Bjornulf Ostvik, Hartford, CT (US)

(73) Assignee: Ecogensus LLC, West Hartford, CT (US)

( * ) Notice: Subject to any disclaimer, the term of this patent is extended or adjusted under 35 U.S.C. 154(b) by 0 days.

(21) Appl. No.: 17/150,904

(22) Filed: Jan. 15, 2021

(65) Prior Publication Data

US 2021/0214629 A1 Jul. 15, 2021

Related U.S. Application Data

(60) Provisional application No. 62/961,552, filed on Jan. 15, 2020.

(51) Int. Cl.
| | |
|---|---|
| *C10L 5/14* | (2006.01) |
| *C10L 9/08* | (2006.01) |
| *C10L 9/10* | (2006.01) |
| *C10B 53/08* | (2006.01) |
| *C10L 5/04* | (2006.01) |

(52) U.S. Cl.
CPC .............. *C10L 5/14* (2013.01); *C10B 53/08* (2013.01); *C10L 5/04* (2013.01); *C10L 9/08* (2013.01); *C10L 9/10* (2013.01); *C10L 2230/22* (2013.01); *C10L 2250/04* (2013.01); *C10L 2290/02* (2013.01); *C10L 2290/22* (2013.01); *C10L 2290/24* (2013.01); *C10L 2290/28* (2013.01)

(58) Field of Classification Search
CPC ........... H04N 1/32363; H04N 1/32368; H04N 1/32379; H04N 1/33323; H04N 1/33338; H04N 1/33346; H04N 2201/3335; C08H 6/00; C08L 5/14; C08L 97/005; C10G 1/045; C10L 10/12; C10L 1/02; C10L 2200/0469; C10L 2290/06; C10L 2290/544; C10L 2290/547; D21C 11/0007; D21C 3/20; D21C 3/22
See application file for complete search history.

(56) References Cited

U.S. PATENT DOCUMENTS

| | | | |
|---|---|---|---|
| 852,025 A | 4/1907 | Mashek | |
| 1,734,992 A | 11/1929 | Barrows | |
| 4,249,909 A * | 2/1981 | Comolli | C10F 5/00 34/402 |
| 4,511,363 A | 4/1985 | Nakamura et al. | |
| 4,725,337 A * | 2/1988 | Greene | C10L 9/00 201/1 |
| 6,165,238 A * | 12/2000 | Parkinson | C10L 5/08 44/553 |
| 2006/0075682 A1 | 4/2006 | Bullinger et al. | |
| 2017/0137731 A1 | 5/2017 | Hunt et al. | |

FOREIGN PATENT DOCUMENTS

| | | |
|---|---|---|
| JP | 3941131 | 7/2007 |
| KR | 2011-0012761 | 2/2011 |
| WO | WO 00/00575 A1 | 1/2000 |

OTHER PUBLICATIONS

Osman et al., "Drying of Low-Rank Coal (LRC)—A Review of Recent Patents and Innovations," Drying Technology: An International Journal, Oct. 3, 2011, 29(15):1763-1783.
International Search Report and Written Opinion in International Appln. No. PCT/US2021/013700, dated Apr. 8, 2021, 9 pages.

\* cited by examiner

*Primary Examiner* — Ellen M McAvoy
*Assistant Examiner* — Chantel L Graham
(74) *Attorney, Agent, or Firm* — Fish & Richardson P.C.

(57) ABSTRACT

A method of preparing a fuel composition includes placing coal having a heat content between about 3,000 BTU/lb and about 9,000 BTU/lb and a moisture content between about 20 wt % and about 60 wt % in a vessel. The coal is exposed to heat and a pressure less than atmospheric pressure within the vessel, thereby reducing the coal, such that an average primary particle size of the coal is less than 1 millimeter. A binder is introduced to the vessel, such that the coal combines with the binder to yield a mixture. The mixture is shaped to yield a fuel composition.

20 Claims, No Drawings

PROCESSING OF LOW RANK COAL

CROSS-REFERENCE TO RELATED APPLICATIONS

This application claims the benefit of priority to U.S. Provisional Application No. 62/961,552 filed on Jan. 15, 2020, and entitled "PROCESSING OF LOW RANK COAL," the contents of which are hereby incorporated by reference.

TECHNICAL FIELD

This disclosure relates to processing of low rank coal, such as lignite.

BACKGROUND

Low rank coal (e.g., lignite) is softer, is more $CO_2$ intensive, and has a higher moisture content and lower fuel value than "hard" coal (e.g., bituminous, sub-bituminous, anthracite). Lignite, the lowest rank coal, typically has a moisture content in a range of 30-60 wt % and a heat content in a range of 4,000-8,300 BTU/lb. In contrast, sub-bituminous coal typically has a moisture content in a range of 10-45 wt %/o and an energy content in a range of 8,500-13,000 BTU/b, and bituminous coal typically has a moisture content in a range of 2-15 wt % and a heat content in a range of 11,000-15,000 BTU/b. Due to its high moisture content and brittle nature, processing of low rank coal requires significant energy input and results in the creation of coal fines (e.g., dust), which presents a combustion hazard and is of little use.

SUMMARY

Certain aspects of the subject matter described can be implemented as a method or preparing a fuel composition. The method includes placing coal having a heat content between about 3,000 BTU/lb and about 9,000 BTU/lb and a moisture content between about 20 wt % and about 60 wt % in a vessel. The coal is exposed to heat and a pressure less than atmospheric pressure within the vessel, thereby reducing a primary particle size of the coal, such that an average primary particle size of the coal is less than 1 millimeter. A binder is introduced to the vessel, such that the coal combines with the binder to yield a mixture. The mixture is shaped to yield a fuel composition.

This, and other aspects, can include one or more of the following features.

In some embodiments, the coal is exposed to heat before combining the coal and the binder. In some embodiments, exposing the coal to heat includes heating the coal by conduction. In some embodiments, exposing the coal to heat includes contacting the coal with a heated surface. In some embodiments, the heated surface includes a rotating blade.

In some embodiments, the coal is agitated in the vessel. In some embodiments, agitating the coal includes intermittently agitating the coal in the vessel.

In some embodiments, exposing the coal to the pressure less than atmospheric pressure within the vessel includes intermittently reducing the pressure in the vessel.

In some embodiments, the mixture is heated by conduction. In some embodiments, the binder includes a plastic substantially free of chlorine. In some embodiments, heating the mixture includes increasing the malleability of the plastic. In some embodiments, heating the mixture includes melting or softening the plastic.

In some embodiments, the fuel composition includes the coal distributed in a plastic matrix.

In some embodiments, shaping the fuel composition includes cutting, shredding, or milling the mixture to form discrete portions of the fuel composition. In some embodiments, the mixture is extruded to yield an extruded fuel product before cutting, shredding, or milling the mixture of coal and binder. In some embodiments, the extruded fuel product includes the coal distributed in a plastic matrix.

In some embodiments, the fuel composition includes about 5 wt % to about 50 wt % of the binder.

In some embodiments, the mixture is heated to a temperature between 100° C. and 250° C., between 110° C. and 240° C., 120° C. and 230° C., between 130° C. and 220° C., or between 140° C. and 210° C.

In some embodiments, the coal placed in the vessel is uncrushed.

Certain aspects of the subject matter described can be implemented as a fuel composition. The fuel composition includes coal having a heat content between about 4,000 BTU/lb and about 8,300 BTU/lb and a binder including plastic. The fuel composition includes less than 5 wt % coal dust having an average primary particle size of 75 micrometers or smaller.

This, and other aspects, can include one or more of the following features.

In some embodiments, the coal includes lignite.

In some embodiments, the binder is in the form of a plastic matrix. In some embodiments, the coal is bound in the plastic matrix.

In some embodiments, the fuel composition includes about 5 wt % to about 50 wt % of the binder. In some embodiments, the fuel composition includes about 5 wt % to about 40 wt % of the binder. In some embodiments, the fuel composition includes about 5 wt % to about 30 wt % of the binder. In some embodiments, the fuel composition includes about 5 wt % to about 25 wt % of the binder. In some embodiments, the fuel composition includes about 5 wt % to about 20 wt % of the binder. In some embodiments, the fuel composition includes about 5 wt % to about 15 wt % of the binder. In some embodiments, the fuel composition includes about 5 wt % to about 10 wt % of the binder. In some embodiments, the fuel composition includes about 10 wt % of the binder.

In some embodiments, the fuel composition is in the form of a solid inhomogeneous mixture.

In some embodiments, the plastic includes polyethylene. In some embodiments, the fuel composition includes polyethylene terephthalate. In some embodiments, the plastic is free of chlorine.

In some embodiments, the fuel composition has a moisture content between about 1 wt % and about 3 wt % or between about 2 wt % and about 3 wt %.

In some embodiments, a heat content of the fuel composition is at least about 9,000 BTU/lb. In some embodiments, a heat content of the fuel composition is at least about 10,000 BTU/lb. In some embodiments, a heat content of the fuel composition is between about 10,000 BTU/lb and about 11,000 BTU/lb. In some embodiments, a heat content of the fuel composition is at least about 1.5, 1.6, 1.7, 1.8, 1.9, or 1.95 times greater than the heat content of the coal.

DETAILED DESCRIPTION

"Low rank coal" is a coal typically having a heat content (for example, higher heating value (HHV)) between about 4,000 BTU/lb and about 8,300 BTU/b and a moisture content between about 20 wt % and about 60 wt % or between about 40 wt % and about 50 wt %. In some embodiments, low rank coal has a fixed carbon content between about 30 wt % and about 70 wt %. In some embodiments, low rank coal has an ash content of less than about 10 wt %. In some embodiments, low rank coal has a volatiles content between about 5 wt % and about 50 Wt/o. One example of low rank coal is lignite.

Transportation of unprocessed low rank coal can be considered inefficient due to its high moisture content. In effect, paying to transport unprocessed low rank coal can be considered wastefully paying for transport of a resource that can be about half water by weight. Thus, it can be beneficial to remove moisture content from low rank coal before transportation. Methods to remove the moisture in lignite have been employed but entail specific challenges. One such challenge is that lignite must often be crushed or pulverized as a separate step, prior to effective moisture removal. For example, in order to remove moisture content from low rank coal, the low rank coal needs to be reduced in size (e.g., pulverized) so that the water trapped in the low rank coal can escape. However, pulverizing the low rank coal in order to reduce moisture content can produce coal dust and can pose handling, logistics and transport challenges, including due to the creation of dust. For example, pulverizing the low rank coal in order to reduce moisture content can produce coal dust and can convert the low rank coal into a non-transportable form (e.g., a hazardous powder). Therefore, after reducing the moisture content of the low rank coal, the low rank coal needs to be re-packaged and/or processed into a transportable form.

The methods described in this disclosure can be implemented to complete the steps of removing moisture content from low rank coal and re-packaging the low rank coal with reduced moisture content into a transportable form in a single batch process. One example advantage of the methods described herein is that the energy content of the coal is increased on a per weight basis, while also displacing a certain percentage of coal with a waste material that otherwise would not be beneficially used, thus allowing for a near-term reduction of the amount of coal needed by the operator due to the higher energy content and reducing the negative environmental impact of coal combustion emissions and the total demand for coal. As described in this disclosure, in some embodiments, low rank coal is combined with a binder to yield a fuel composition including a binder.

Suitable binders include one or more plastics, such as low, medium, and high-density polyethylene. Some additional examples of a suitable binder include polyethylene terephthalate, polystyrene, polyester, polyamides, acrylonitrile butadiene styrene, polyethylene/acrylonitrile butadiene styrene, polycarbonate, polycarbonate/acrylonitrile butadiene styrene, polyurethanes, maleimide/bismaleimide, melamine formaldehyde, phenol formaldehydes, polyepoxide, polyetheretherketone, polyetherimide, polyimide, polylactic acid, polymethyl methacrylate, polytetrafluoroethylene, urea-formaldehyde, and polypropylene. The fuel composition typically includes between 5 wt % and 50 wt % of the binder (e.g., between 5 wt % and 40 wt %, between 5 wt % and 30 wt %, between 5 wt % and 25 wt/o, between 5 wt % and 20 wt %, between 5 wt % and 15 wt %, or between 5 wt % and 10 wt/o). In one example, the fuel composition includes about 10 wt % of the binder. The binder is typically free of chlorine. In some embodiments, the binder is substantially free of chlorine-containing plastics, such as polyvinyl chloride. The fuel composition is in the form of a solid, inhomogeneous mixture (e.g., a plastic matrix, with the coal bound in the plastic matrix). The binder can be reclaimed from municipal waste or recycling. The binder can be used as is or cut or shredded before it is combined with the coal.

Processing low rank coal includes placing coal having a heat content between about 4,000 BTU/lb and about 8,300 BTU/lb in a vessel. The coal can be uncrushed (e.g., straight from a mine) or crushed. In some cases (e.g., when the coal is crushed), the binder is combined with the coal before heating. In other cases (e.g., when the coal is uncrushed), the coal is heated prior to addition of the binder. The coal (or coal-binder mixture) can be sealed in the vessel.

The coal (or coal-binder mixture) is heated by conduction. Heating the coal (or coal-binder mixture) by conduction includes contacting the coal (or coal-binder mixture) with a heated surface. Heating the coal (or coal-binder mixture) can occur without providing heated gas (e.g., air) to the vessel. In one example, the heated surface includes one or more blades configured to rotate in the vessel. The coal (or coal-binder mixture) can be heated to a temperature up to about 250° C. In some examples, the coal (or coal-binder mixture) is heated to a temperature between 100° C. and 250° C., between 110° C. and 240° C., between 120° C. and 230° C., between 130° C. and 220° C., or between 140° C. and 210° C. The heat provided is insufficient to pyrolyze the coal. Moreover, in some embodiments, heated fluid (e.g., in the form of steam or air) is not provided to the vessel.

When the coal (or coal-binder mixture) is heated by a blade configured to rotate in the vessel, the blade(s) can be rotated at a speed between about 1 and about 10 rotations per minute. The blade(s) can be rotated intermittently, such that the blade is stationary at times and in motion at other times. The intermittent rotation can occur in a pattern (e.g., periodically) or occur randomly. The coal (or coal-binder mixture) can be agitated (e.g., by rotation of the blade(s)). The agitation can occur intermittently (e.g., during rotation of the blade(s)). In some embodiments, the agitation is intermittently performed in intervals of about 1 minute separated by pauses in agitation of about 1 minute to about 3 minutes. In some embodiments, the blade(s) protrude radially outward from and are coupled to a central rod. In some embodiments, the central rod is rotated, for example, by a motor, to rotate the blade(s), resulting in agitation of the coal within the vessel. While the methods provided herein can produce fines and/or dust during processing, the fines and/or dust are largely stabilized once the processing has been completed to significantly reduce the amount of fines and/or dust by-product that are produced by the system. For example, during processing, the fines and/or dust can be stabilized by either densifying the fines and/or dust into a solid fuel product and/or by adding plastic to bind the fines and/or dust together to form the solid fuel product. The pattern, duration, and extent of agitation can be selected to reduce or minimize pulverization of the coal, and thereby reduce or minimize the amount of fines and/or dust by-product produced from the coal.

In some embodiments, the blade(s) are rotated at a speed that is less than 25 revolutions per minute (rpm), less than 20 rpm, less than 15 rpm, less than 10 rpm, or less than 5 rpm. In some embodiments, the blade(s) are rotated at a speed between 2 rpm and 25 rpm. In some embodiments, the speed at which the blade(s) are rotated is varied. In some embodiments, the speed at which the blade(s) are rotated is varied between 1 rpm and 25 rpm. In some embodiments, the blades are not rotated at all, or not rotated for a desired time duration (e.g., 1 min to 5 mins). In some embodiments, the speed at which the blade(s) are rotated alternates between gradually decreasing and gradually increasing. In some embodiments, the time duration(s) of no rotation of the blade(s) is between 1 minute and 3 minutes. In some embodiments, the blade(s) are rotated around a longitudinal axis defined by the central rod, such that an outermost tip of the blade(s) has a maximum tangential velocity of about 20 inches per second (in/s) or about 15 in/s. In some embodiments, the blade(s) are rotated around the longitudinal axis defined by the central rod, such that the outermost tip of the blade(s) has a tangential velocity between 5 in/s and 15 in/s.

The pressure in the vessel can be reduced to below atmospheric pressure (vacuum). As used in this disclosure, the term "vacuum" can encompass any pressure that is less than atmospheric pressure (1 atmosphere). Reducing the pressure in the vessel can occur intermittently. The intermittent pressure reduction can occur in a pattern (e.g., periodically) or occur randomly. That is, the pressure may be reduced, then allowed to increase (e.g., to atmospheric pressure), and then reduced again. The pressure in the vessel can be reduced to a pressure between 10 torr and 150 torr, between 50 torr and 150 torr, or between 50 torr and 100 torr. With reduced pressure in the vessel, the coal may be heated to a temperature between about 30° C. and about 100° C. Reducing the pressure in the vessel (e.g., to about 50 torr) and heating to a lower temperature (e.g., 40° C.) may yield the same results as heating at a greater pressure (e.g., atmospheric pressure) and a greater temperature (e.g., 140° C.). Reducing the pressure promotes thermal transformation, removal of moisture (e.g., in the form of water vapor), and also promotes removal of oxygen, thereby mitigating and/or preventing ignition of the coal.

Pressure reduction in the vessel can be carried out by using, for example, a vacuum pump. Reducing pressure in the vessel can involve using the vacuum pump to evacuate vapor from an interior of the vessel. For example, an outlet of a vapor space of the vessel is connected to the vacuum pump, and during operation, the vacuum pump pulls vapor from the vapor space of the vessel. The outlet of the vapor space of the vessel that is connected to the vacuum pump is located a predetermined distance away from a processing zone of the vessel that includes the rotating blade(s). In some embodiments, the outlet is located at least one radius away from an outermost tip of the rotating blade(s), in which the radius is defined as the distance between the central rod and the outermost tip of the rotating blade(s). For example, for mixing blade(s) that radially protrude twelve inches from the central rod, the radius is twelve inches, and the outlet is located at least twelve inches away from the outermost tip of the rotating blade(s). In this example, this also means that the outlet is located at least 24 inches away from the central rod. In some embodiments, the outlet is located at least one radius away from the outermost tip of the rotating blade(s) and also above the rotating blade(s) with respect to gravity. The orientation of the outlet and the distance away from the processing zone (the rotating blade(s)) can mitigate and/or prevent coal dust from being evacuated with the vapor by the vacuum pump. The intermittent agitation can also mitigate and/or prevent coal dust from being evacuated with the vapor by the vacuum pump. For example, by pausing the agitation intermittently, coal dust can be allowed to settle via gravity to mitigate and/or prevent coal dust from being evacuated with the vapor by the vacuum pump.

In some embodiments, a knockout pot is included between the outlet and the vacuum pump for collecting water. In some embodiments, a filter is included between the outlet and the vacuum pump for mitigating and/or preventing particulates from reaching the vacuum pump. In some embodiments, the filter is downstream of the knockout pot. In some embodiments, the filter is a single stage filter. In some embodiments, the filter is a multi-stage filter, such as a dual stage filter or a 3-stage filter. For example, the filter is a multi-stage filter having a 1l stage filter defining openings with a maximum dimension between 30 micrometers and 50 micrometers, a $2^{nd}$ stage filter defining openings with a maximum dimension between 10 micrometers and 20 micrometers, and a $3^{rd}$ stage filter defining openings with a maximum dimension between 2 micrometers and 10 micrometers.

Thus, the coal (or coal-binder mixture) is introduced to a single vessel, and processed by a low speed, mid to high torque mechanical blending while being exposed to heat (i.e., contacting heated surfaces). Heat and/or vacuum exposure within the vessel can cause the coal to be reduced in size without requiring a time and/or energy-intensive process of mechanically reducing the coal (for example, by smashing or rigorous agitation using substantial force, and/or investing several hours of time to process). In some cases, the coal is pulverized into fines and/or dust within a short time (e.g., between 5-30 minutes) of being exposure to heat and vacuum within the vessel. In some embodiments, the coal is reduced to having an average primary particle size of less than 1 millimeter within a predetermined time. As used herein, a "primary particle size" refers to the longest linear dimension, e.g., a maximum length or a maximum diameter, of a primary particle. As used herein, a "primary particle" is an individual single particle, not an agglomeration of two or more particles. In some embodiments, a primary particle can be visually identified by microscopy and distinguished from agglomerations of two or more primary particles based on size, shape, or both.

In some embodiments, the coal is reduced to having an average primary particle size between 1 micrometer and 1 millimeter, between 1 micrometer and 500 micrometers, or between 1 micrometer and 100 micrometers. In some embodiments, the coal is reduced to having an average primary particle size of about or less than 100 micrometers (e.g., or about or less than 90 micrometers, 80 micrometers, 70 micrometers, 60 micrometers, 50 micrometers, 40 micrometers, 30 micrometers, 20 micrometers, 10 micrometers, 9 micrometers, 8 micrometers, 7 micrometers, 6 micrometers, 5 micrometers, 3 micrometers, or 1 micrometer).

In some embodiments, the predetermined time for achieving the desired average primary particle size is about or no more than 5 minutes, 10 minutes, 15 minutes, 20 minutes, 25 minutes, 30 minutes, 1 hour, 2 hours, or about or no more than 3 hours of being exposed to heat and/or vacuum within the vessel.

In cases in which binder is included, the heat exposure causes the binder to melt or soften. In some cases, the coal is pre-heated (e.g., 10 to 20 minutes) before addition of the binder. After addition of the binder, the coal-binder mixture is processed until the binder reaches a temperature of at least 180° C. (e.g., sufficient to melt or soften the plastic). The melted or softened plastic can serve as a binder for the coal that has been reduced in size from being exposed to heat and vacuum within the vessel. The coal or coal-binder mixture (both of which can be considered a fuel composition) can be mechanically forced through an extrusion die to yield a shaped fuel composition. The shaped fuel composition can be cut, shredded, or milled to form discrete portions of the fuel composition. In some cases, the discrete portions can include pellets or briquettes. In some cases, the coal-binder mixture does not undergo extrusion (which can be energy-intensive) and is simply cut, shredded, or milled to form discrete portions of the fuel composition.

The fuel composition has a moisture content of less than 3 wt %, less than 2 wt %, or less than 1 wt %, and a heat content of at least about 1.5, 1.6, 1.7, 1.8, 1.9, or 1.95 times greater than the heat content of the unprocessed coal (e.g., at least about 9,000 BTU/lb, at least about 10,000 BTU/lb, or between about 10,000 BTU/lb and about 11,000 BTU/lb). In some embodiments, the fuel composition has a fixed carbon content between about 40 wt % and about 70 wt % or between about 50 wt % and about 60 wt %. In some embodiments, the fuel composition has an ash content between about 5 wt % and 20 wt % or between about 10 wt % and about 20 wt %. In some embodiments, the fuel composition has a volatiles content between about 40 wt % and about 70 wt %, between about 40 wt % and about 60 wt %, or between about 40 wt % and about 50 wt %.

In some embodiments, after the fuel composition has been formed, it is substantially free of coal dust (for example, the composition is substantially free of coal particulates having an average size of 75 micrometers or smaller). The term "substantially free" can refer to the composition containing less than 1 wt. % (e.g., less than 0.5 wt. %, less than 0.1 wt. %, less than 0.01 wt. % or less than 0.001 wt. %) of a material. In some embodiments, after the fuel composition has been formed, it comprises less than 20 wt % coal dust, less than 15 wt % coal dust, less than 10 wt % coal dust, less than 5 wt % coal dust, less than 4 wt % coal dust, less than 3 wt % coal dust, less than 2 wt % coal dust, less than 1 wt % coal dust, less than 0.5 wt % coal dust, or less than 0.1 wt % coal dust. In some embodiments, after the fuel composition has been formed, it is substantially free of coal dust. In some embodiments, after the fuel composition has been formed, it releases less than 20 wt % coal dust, less than 15 wt % coal dust, less than 10 wt % coal dust, less than 5 wt % coal dust, less than 4 wt % coal dust, less than 3 wt % coal dust, less than 2 wt % coal dust, less than 1 wt % coal dust, less than 0.5 wt % coal dust, or less than 0.1 wt % coal dust.

The methods described herein can be implemented to convert unprocessed, uncrushed low rank coal into the fuel composition provided herein within 1 hour, within 55 minutes, within 50 minutes, within 45 minutes, within 40 minutes, within 35 minutes, within 30 minutes, within 25 minutes, or within 20 minutes.

Example

Uncrushed lignite coal taken directly from a Mississippi mine showed typical characteristics: 43.22 wt % moisture, 26.4 wt % volatiles, HHV of 5922 BTU/b, 0.012 wt % sulfur, and 6.63 wt % ash. The composition of the uncrushed and unprocessed lignite coal is provided in Table 1.

TABLE 1

Composition of uncrushed lignite coal

| Component | Amount (wt %) |
|---|---|
| Moisture | 43.22 |
| Carbon | 34.96 |
| Hydrogen | 2.71 |
| Nitrogen | 0.65 |
| Sulfur | 0.012 |
| Ash | 6.63 |
| Oxygen | 11.82 |

The coal was exposed to heat ranging from 140-208° C. for a duration of approximately 60 minutes. The mechanism of heat transfer was conduction. Slow speed (up to 25 rpm), high torque mechanical blades were used to promote intermittent contact with the lignite, and a careful balance was maintained to reduce creation of coal dust. The mechanical blades were rotated intermittently, and the rotation speed varied between 0 rpm and 25 rpm with gradual increases and decreases. The rotation of the mechanical blades was paused (that is, no rotation) for time durations of between 1 minute and 2 minutes. The coal was kept in a vessel at all times, with intermittent exposure to vacuum. The vacuum was introduced (1) to remove oxygen and, thus, reduces the likelihood of ignition of the coal and (2) to promote thermal transformation. The pressure within the processing chamber, at various points during processing, was kept at 150 torr or less. The combination of heat and slow speed intermittent mechanical processing facilitated a natural breakdown of the coal.

10 wt % plastic (a blend of high-density polyethylene, low-density polyethylene, and polyethylene terephthalate) was combined with the coal after the coal had been preheated, by introducing the plastic between the 10 and 20 minute time intervals. Samples 1 and 2 were the resulting fuel compositions after the coal was processed and combined with the plastic. In Sample 1, the coal and plastic mixture was extruded. In Sample 2, the coal and plastic mixture was not extruded. Processing of the lignite resulted in a moisture reduction from 43.22 wt % to less than 3 wt % (2.46 wt % and 1.43 wt % for Samples 1 and 2, respectively) and an increase in energy content from 5,922 BTU/lb to 10,649 and 10,285 BTU/lb (HHV) for Samples 1 and 2, respectively. The compositions of Samples 1 and 2 are provided in Table 2.

TABLE 2

Composition of Samples 1 and 2

| Component | Sample 1 (extruded) Amount (wt %) | Sample 2 (not extruded) Amount (wt %) |
|---|---|---|
| Moisture | 2.46 | 1.43 |
| Carbon | 58.95 | 58.23 |
| Hydrogen | 5.02 | 4.83 |
| Nitrogen | 0.97 | 1.01 |
| Sulfur | 0.352 | 0.412 |
| Ash | 13.64 | 14.76 |
| Oxygen | 18.61 | 19.33 |

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "between 0.1% and about 5%" or "between 0.1% and 5%" should be interpreted to include about 0.1% to about 5%, as well as the individual values (for example, 1%, 2%, 3%, and 4%) and the sub-ranges (for example, between 0.1% and 0.5%, between 1.1% and 2.2%, and between 3.3% and 4.4%) within the indicated range. The statements "X to Y" and "between X and Y" have the same meanings as "about X to about Y" and "between about X and about Y", unless indicated otherwise. Likewise, the statement "X, Y, or Z" has the same meaning as "about X, about Y, or about Z," unless indicated otherwise.

The details of one or more embodiments of the subject matter of this disclosure are set forth in the accompanying drawings and the description. Other features, aspects, and advantages of the subject matter will become apparent from the description, the drawings, and the claims.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of preparing a fuel composition, the method comprising:
   placing coal having a heat content between about 3,000 BTU/lb and about 9,000 BTU/lb and a moisture content in a range between about 20 wt % and about 60 wt % in a vessel;
   exposing the coal to heat and a pressure less than atmospheric pressure within the vessel, thereby reducing the coal, such that an average primary particle size of the coal is less than 1 millimeter;
   introducing a binder to the vessel, such that the coal combines with the binder to yield a mixture; and
   shaping the mixture to yield a fuel composition.

2. The method of claim 1, wherein the coal is exposed to heat before combining the coal and the binder.

3. The method of claim 2, wherein exposing the coal to heat comprises heating the coal by conduction.

4. The method of claim 3, wherein exposing the coal to heat comprises contacting the coal with a heated surface.

5. The method of claim 4, wherein the heated surface comprises a rotating blade.

6. The method of claim 3, further comprising agitating the coal in the vessel.

7. The method of claim 6, wherein agitating the coal comprises intermittently agitating the coal in the vessel.

8. The method of claim 1, wherein exposing the coal to the pressure less than atmospheric pressure within the vessel comprises intermittently reducing the pressure in the vessel.

9. The method of claim 1, further comprising heating the mixture by conduction.

10. The method of claim 1, wherein the binder comprises a plastic substantially free of chlorine.

11. The method of claim 9, wherein heating the mixture comprises increasing the malleability of the plastic.

12. The method of claim 11, wherein heating the mixture comprises melting or softening the plastic.

13. The method of claim 12, wherein the fuel composition comprises the coal distributed in a plastic matrix.

14. The method of claim 1, wherein shaping the fuel composition comprises cutting, shredding, or milling the mixture to form discrete portions of the fuel composition.

15. The method of claim 14, further comprising, before cutting, shredding, or milling the mixture of coal and binder, extruding the mixture to yield an extruded fuel product.

16. The method of claim 14, wherein the extruded fuel product comprises the coal distributed in a plastic matrix.

17. The method of claim 1, wherein the fuel composition comprises about 5 wt % to about 50 wt % of the binder.

18. The method of claim 1, further comprising heating the mixture to a temperature between 100° C. and 250° C., between 110° C. and 240° C., 120° C. and 230° C., between 130° C. and 220° C., or between 140° C. and 210° C.

19. The method of claim 1, wherein the coal placed in the vessel is uncrushed.

20. A method of preparing a fuel composition, the method comprising:
   placing coal having a heat content between about 3,000 BTU/lb and about 9,000 BTU/lb and a moisture content in a range between about 20 wt % and about 60 wt % in a vessel;
   exposing the coal to heat, intermittent agitation, and a pressure less than atmospheric pressure within the vessel, thereby reducing the coal, such that an average primary particle size of the coal is less than 1 millimeter;
   introducing a binder to the vessel, such that the coal combines with the binder to yield a mixture; and
   shaping the mixture to yield a fuel composition.

* * * * *